(12) United States Patent
Cama et al.

(10) Patent No.: US 9,293,041 B2
(45) Date of Patent: Mar. 22, 2016

(54) TRAFFIC MONITORING VIA TELECOMMUNICATION DATA

(71) Applicant: International Business Machines Corporation, Armonk, NY (US)

(72) Inventors: Karl J. Cama, Colleyville, TX (US); Norbert Herman, Denver, CO (US); Daniel T. Lambert, Manhattan, NY (US); Philip A. Westcott, London (GB)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 14/243,287

(22) Filed: Apr. 2, 2014

(65) Prior Publication Data

US 2015/0287319 A1     Oct. 8, 2015

(51) Int. Cl.

| | |
|---|---|
| *G06F 19/00* | (2011.01) |
| *G06Q 40/00* | (2012.01) |
| *G08G 1/07* | (2006.01) |
| *G08G 1/01* | (2006.01) |
| *G01S 19/13* | (2010.01) |
| *G01S 5/00* | (2006.01) |
| *G01S 5/02* | (2010.01) |

(52) U.S. Cl.
CPC ............... *G08G 1/07* (2013.01); *G01S 5/0036* (2013.01); *G01S 5/0252* (2013.01); *G01S 19/13* (2013.01); *G08G 1/0125* (2013.01); *G08G 1/0145* (2013.01)

(58) Field of Classification Search
USPC ........................... 701/117; 705/36 R; 340/911
See application file for complete search history.

(56) References Cited

U.S. PATENT DOCUMENTS

| | | | | |
|---|---|---|---|---|
| 6,577,946 | B2 * | 6/2003 | Myr | 701/117 |
| 8,064,925 | B1 * | 11/2011 | Sun et al. | 455/456.1 |
| 8,386,156 | B2 | 2/2013 | Miller | |
| 8,433,505 | B2 * | 4/2013 | Rogers | 701/119 |
| 8,694,241 | B1 * | 4/2014 | Kadous et al. | 701/412 |
| 2005/0222933 | A1 * | 10/2005 | Wesby | 705/36 |
| 2008/0235398 | A1 * | 9/2008 | Helbing et al. | 709/243 |
| 2012/0209510 | A1 * | 8/2012 | Ikawa et al. | 701/423 |
| 2012/0274481 | A1 * | 11/2012 | Ginsberg et al. | 340/905 |
| 2013/0106620 | A1 * | 5/2013 | Cao et al. | 340/911 |
| 2013/0275116 | A1 * | 10/2013 | Garvin et al. | 704/2 |

OTHER PUBLICATIONS

Brodkin, "Cell phone tracking system reveals how traffic jams start", Ars Technica, Feb. 17, 2013, 3 pages.

(Continued)

*Primary Examiner* — Thomas G Black
*Assistant Examiner* — Tyler Paige
(74) *Attorney, Agent, or Firm* — Dan Simek; Hoffman Warnick LLC

(57) ABSTRACT

Various embodiments include a system having: at least one computing device configured to monitor a motor vehicle traffic pattern by performing actions including: obtaining telecommunications data from a plurality of mobile devices within a hyper-local area over a hyper-local period; identifying a set of mobile devices within the plurality of mobile devices travelling by motor vehicle from the telecommunications data; determining the motor vehicle traffic pattern based upon the telecommunications data from the set of mobile devices traveling by motor vehicle; comparing the determined motor vehicle traffic pattern with a threshold motor vehicle traffic pattern; and providing instructions for modifying at least one traffic signal device in response to the determined motor vehicle traffic pattern deviating from the threshold motor vehicle traffic pattern.

20 Claims, 4 Drawing Sheets

(56) References Cited

OTHER PUBLICATIONS

Goswami, "Traffic problem finds cell phone solution: Phone traffic used as proxy for people traffic", Computerworld.com: Article 9033738, Aug. 30, 2007, 4 pages.

Lamb, "How Audi's Travolution Device Will Work", HowStuffWorks "Intelligent Traffic Lights", Sep. 3, 2013, 3 pages.
"SCOOT—The world's leading adaptive traffic control system", http://www.scoot-utc.com/, Sep. 3, 2013, 1 page.
"Voldswagen", www.volkswagenag.com/content/vwcorp/content/de/homepage.html, 1 page.

* cited by examiner

| ID | Sector | Sector | Sector | Sector | Timestamp |
|---|---|---|---|---|---|
| A | 12 | 9 | 9 | 8 | 15:00:12 |
| B | 4 | 2 | 4 | 3 | 15:00:15 |
| A | 12 | 7 | 10 | 10 | 15:00:16 |
| B | 4 | 2 | 4 | 4 | 15:00:20 |
| A | 10 | 6 | 5 | 8 | 15:00:25 |
| … | … | … | … | … | … |
| A | 9 | 7 | 10 | 9 | 15:10:12 |
| B | 4 | 2 | 4 | 4 | 15:19:20 |
| A | 9 | 7 | 10 | 8 | 15:20:15 |
| B | 4 | 2 | 4 | 4 | 15:21:02 |
| … | … | … | … | … | … |
| A | 7 | 6 | 8 | 8 | 15:22:10 |
| B | 4 | 2 | 4 | 5 | 15:23:52 |
| A | 8 | 5 | 5 | 6 | 15:24:15 |
| B | 4 | 2 | 4 | 5 | 15:25:32 |

FIG. 2

TRAFFIC MONITORING VIA TELECOMMUNICATION DATA

BACKGROUND

The present invention relates generally to data analysis, and more particularly, to the enhancement of traffic routing using telecommunication data analytics.

Basic traffic lights operate on individual fixed timers that are set to different patterns based on the time of day, the day of the week, etc. For example, a traffic light may have a first setting for weekdays, when rush hour traffic is expected, and a different setting for weekends, when less traffic is anticipated. While very common, these multi-mode traffic lights are highly inefficient. For instance, such traffic lights fail to take into consideration constantly changing conditions such as weather, accidents, construction, road repair, congestion, peak hours, special events, and even lulls in traffic.

Several attempts have been made to improve the flow of traffic. For example, some traffic light systems may include trip sensors and basic synchronization that allow a vehicle to travel through timed intersections. Newer, networked traffic light systems may generate a signal (e.g., via Wi-Fi) that can be intercepted by a vehicle. Upon receipt of such a signal from a traffic light, the vehicle can display how fast the driver should be travelling to time the traffic light correctly. The infrastructure is also built to be two-way, meaning that certain vehicles can provide feedback to a traffic light, which allows the traffic light to modify its operation based on current traffic conditions. While this concept has actually been very effective, widespread adoption has not taken place. One issue is that individual vehicles need to be equipped with rather expensive technology and integration. What is needed, therefore, is a system that can be universally used, regardless of vehicle age, make, or model, with minimal disruptions to existing networked traffic light systems.

SUMMARY

Various embodiments include a system having: at least one computing device configured to monitor a motor vehicle traffic pattern by performing actions including: obtaining telecommunications data from a plurality of mobile devices within a hyper-local area over a hyper-local period; identifying a set of mobile devices within the plurality of mobile devices travelling by motor vehicle from the telecommunications data; determining the motor vehicle traffic pattern based upon the telecommunications data from the set of mobile devices traveling by motor vehicle; comparing the determined motor vehicle traffic pattern with a threshold motor vehicle traffic pattern; and providing instructions for modifying at least one traffic signal device in response to the determined motor vehicle traffic pattern deviating from the threshold motor vehicle traffic pattern.

A first aspect of the disclosure includes a system having: at least one computing device configured to monitor a motor vehicle traffic pattern by performing actions including: obtaining telecommunications data from a plurality of mobile devices within a hyper-local area over a hyper-local period; identifying a set of mobile devices within the plurality of mobile devices travelling by motor vehicle from the telecommunications data; determining the motor vehicle traffic pattern based upon the telecommunications data from the set of mobile devices traveling by motor vehicle; comparing the determined motor vehicle traffic pattern with a threshold motor vehicle traffic pattern; and providing instructions for modifying at least one traffic signal device in response to the determined motor vehicle traffic pattern deviating from the threshold motor vehicle traffic pattern.

A second aspect of the disclosure includes a computer-implemented method of monitoring a motor vehicle traffic pattern, the computer-implemented method including: obtaining telecommunications data from a plurality of mobile devices within a hyper-local area over a hyper-local period; identifying a set of mobile devices within the plurality of mobile devices travelling by motor vehicle from the telecommunications data; determining the motor vehicle traffic pattern based upon the telecommunications data from the set of mobile devices traveling by motor vehicle; comparing the determined motor vehicle traffic pattern with a threshold motor vehicle traffic pattern; and providing instructions for modifying at least one traffic signal device in response to the determined motor vehicle traffic pattern deviating from the threshold motor vehicle traffic pattern.

A third aspect of the disclosure includes a computer program product having program code embodied in at least one computer-readable storage medium, which when executed by at least one computing device, enables the at least one computing device to monitor a motor vehicle traffic pattern by performing actions including: obtaining telecommunications data from a plurality of mobile devices within a hyper-local area over a hyper-local period; identifying a set of mobile devices within the plurality of mobile devices travelling by motor vehicle from the telecommunications data; determining the motor vehicle traffic pattern based upon the telecommunications data from the set of mobile devices traveling by motor vehicle; comparing the determined motor vehicle traffic pattern with a threshold motor vehicle traffic pattern; and providing instructions for modifying at least one traffic signal device in response to the determined motor vehicle traffic pattern deviating from the threshold motor vehicle traffic pattern.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 2 depicts a table of sector data obtained for two different mobile devices at different times according to various embodiments.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
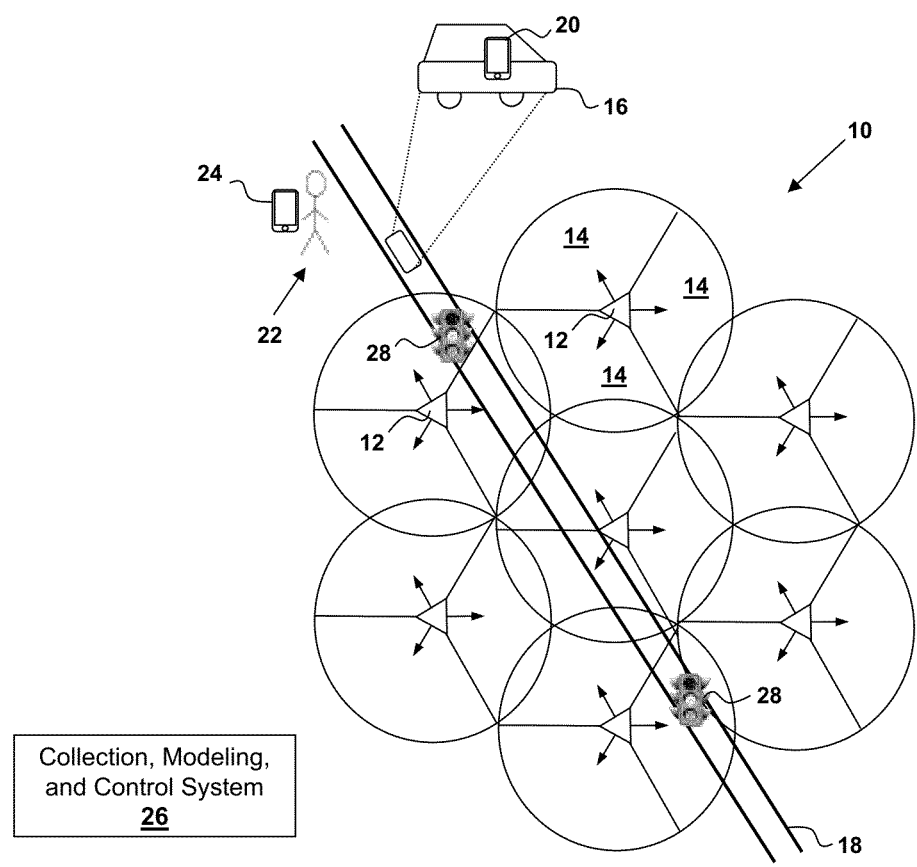
FIG. 1 depicts an illustrative cellular network including a plurality of 3-sector cell towers according to various embodiments.

The present invention relates generally to data analysis, and more particularly, to the enhancement of traffic routing using telecommunication data analytics. As used herein, unless otherwise noted, the term "set" means one or more (i.e., at least one) and the phrase "any solution" means any now known or later developed solution.

In accordance with various embodiments, telecommunication data (e.g., fourth-generation cellular network data, also called 4G data) is leveraged to enhance traffic routing. For example, "snapshots" of telecommunication data gathered at different times (e.g., during the day, at night, on the weekend, etc.) can be used to update traffic light operation in order enhance traffic routing. Traffic patterns determined using the telecommunication data can be used to manually/automatically adjust, and in some cases, optimize, the operation of one or more traffic lights or a networked grid of traffic lights.

A 4G cellular network has very precise location detection on the x, y, and z axes. As a cellular mobile device moves within such a cellular network, the sector data (e.g., sector location, signal strength) of the mobile device changes even after a relatively short displacement (e.g., 100 feet) in any direction. By analyzing the sector data of one or more mobile devices over time, various embodiments described herein are capable of: mapping the movement of one or more mobile devices (or, each mobile device); determining the speed at which each of the mobile device(s) is moving; differentiating between a mobile device located within a motor vehicle (e.g., automobile, motorized scooter, moped, etc.) and a mobile device carried by a person who is travelling by non-motorized transportation methods (e.g., walking, hiking, jogging, biking, etc.); and determining traffic patterns (e.g., automobile traffic patterns, bicycle traffic patterns, etc.) based on the movement and speed of one or more mobile devices.

Using this data, the various embodiments described herein can be used, for example, to adjust, and in some cases, optimize, the operation of one or more traffic lights or a networked grid of traffic lights. In various embodiments, as will be described in greater detail below, the sector data of one or more mobile devices may be analyzed in a hyper-local area (e.g., an area including up to 5 cell towers) and during a hyper-local time window (e.g., <1 minute) to provide local "pre-emptive" signals for controlling nearby traffic lights.

Various embodiments of the disclosure include a system having: at least one computing device configured to monitor a motor vehicle traffic pattern by performing actions including: obtaining telecommunications data from a plurality of mobile devices within a hyper-local area over a hyper-local period; identifying a set of mobile devices within the plurality of mobile devices travelling by motor vehicle from the telecommunications data; determining the motor vehicle traffic pattern based upon the telecommunications data from the set of mobile devices traveling by motor vehicle; comparing the determined motor vehicle traffic pattern with a threshold motor vehicle traffic pattern; and providing instructions for modifying at least one traffic signal device in response to the determined motor vehicle traffic pattern deviating from the threshold motor vehicle traffic pattern.

Additional embodiments include a computer-implemented method of monitoring a motor vehicle traffic pattern, the computer-implemented method including: obtaining telecommunications data from a plurality of mobile devices within a hyper-local area over a hyper-local period; identifying a set of mobile devices within the plurality of mobile devices travelling by motor vehicle from the telecommunications data; determining the motor vehicle traffic pattern based upon the telecommunications data from the set of mobile devices traveling by motor vehicle; comparing the determined motor vehicle traffic pattern with a threshold motor vehicle traffic pattern; and providing instructions for modifying at least one traffic signal device in response to the determined motor vehicle traffic pattern deviating from the threshold motor vehicle traffic pattern.

Various further embodiments include a computer program product having program code embodied in at least one computer-readable storage medium, which when executed by at least one computing device, enables the at least one computing device to monitor a motor vehicle traffic pattern by performing actions including: obtaining telecommunications data from a plurality of mobile devices within a hyper-local area over a hyper-local period; identifying a set of mobile devices within the plurality of mobile devices travelling by motor vehicle from the telecommunications data; determining the motor vehicle traffic pattern based upon the telecommunications data from the set of mobile devices traveling by motor vehicle; comparing the determined motor vehicle traffic pattern with a threshold motor vehicle traffic pattern; and providing instructions for modifying at least one traffic signal device in response to the determined motor vehicle traffic pattern deviating from the threshold motor vehicle traffic pattern.

A portion of a simplified cellular network 10 including a plurality of 3-sector cell towers (or simply, cell tower(s)) 12 is depicted schematically in FIG. 1 according to various embodiments. Although shown as providing only three (3) sectors 14 per cell tower 12, modern cell towers often include up to 12 or more sectors. It is understood that this example depiction in FIG. 1, therefore, does not limit the various embodiments described herein to 3-sector cell towers 12, and can be applied to various sector cell tower configurations known in the art.

In FIG. 1, a vehicle 16 is shown traveling on a road 18 that passes through the cellular network 10. A first mobile device (e.g., mobile phone, tablet device, netbook, laptop, etc.) 20 is located within the vehicle 16. A person 22 having a second mobile device (e.g., mobile phone, tablet device, netbook, laptop, etc.) 24 is shown walking along the side of road 18 (e.g., along a sidewalk). In embodiments, a collection, modeling, and control system 26 obtains telecommunications data 140 (FIG. 3), also referred to as sector data, from a set of the cell towers 12 of the cellular network 10 in a hyper-local area for at least one mobile device (e.g., mobile device 20, 24, etc.) moving within the cellular network 10. The collection, modeling, and control system 26 uses the telecommunications data 140 (sector data) to control one or more traffic light(s) 28 or a networked grid of traffic lights 28 along the road 18.

FIG. 2 depicts a table 30 showing example telecommunications data 140 (sector data) obtained for two different mobile devices A, B at different times according to various embodiments. The telecommunications data 140 (sector data) is obtained from the four nearest cell towers to each of the mobile devices A, B, at any given time.

Based on the telecommunications data 140 (sector data) in table 30, several conclusions can be made. For example, comparing the telecommunications data 140 (sector data) for mobile device A contained in the top section (sections separated by rows having " . . . " indicators) of the table 30, reproduced below, it is apparent that mobile device A is associated with a moving (likely motor) vehicle because of the cumulative and/or continuous change in the corresponding telecommunications data 140 (sector data) over a short period of time (i.e., in 13 seconds in this example).

| ID | Sector | Sector | Sector | Sector | Timestamp |
|----|--------|--------|--------|--------|-----------|
| A  | 12     | 9      | 9      | 8      | 15:00:12  |
| A  | 12     | 7      | 10     | 10     | 15:00:16  |
| A  | 10     | 6      | 5      | 8      | 15:00:25  |

When comparing the telecommunications data 140 (sector data) for mobile device B throughout the table 30, however, it is apparent that mobile device B is associated with a person who may be walking, because of the minimal change in the corresponding telecommunications data 140 (sector data) over a long period of time (i.e., 10 minutes).

In the center section of the table 30, the sector location for mobile device A barely changes over a 10 minute period. This may indicate that the vehicle associated with mobile device A is stuck in traffic. A few minutes later, however, based on the telecommunications data 140 (sector data) contained in the bottom section of the table 30, it is apparent the vehicle associated with mobile device A is once again moving and is no longer stuck in traffic because of the cumulative change in the corresponding telecommunications data 140 (sector data) over a short period of time.

Figure 3:
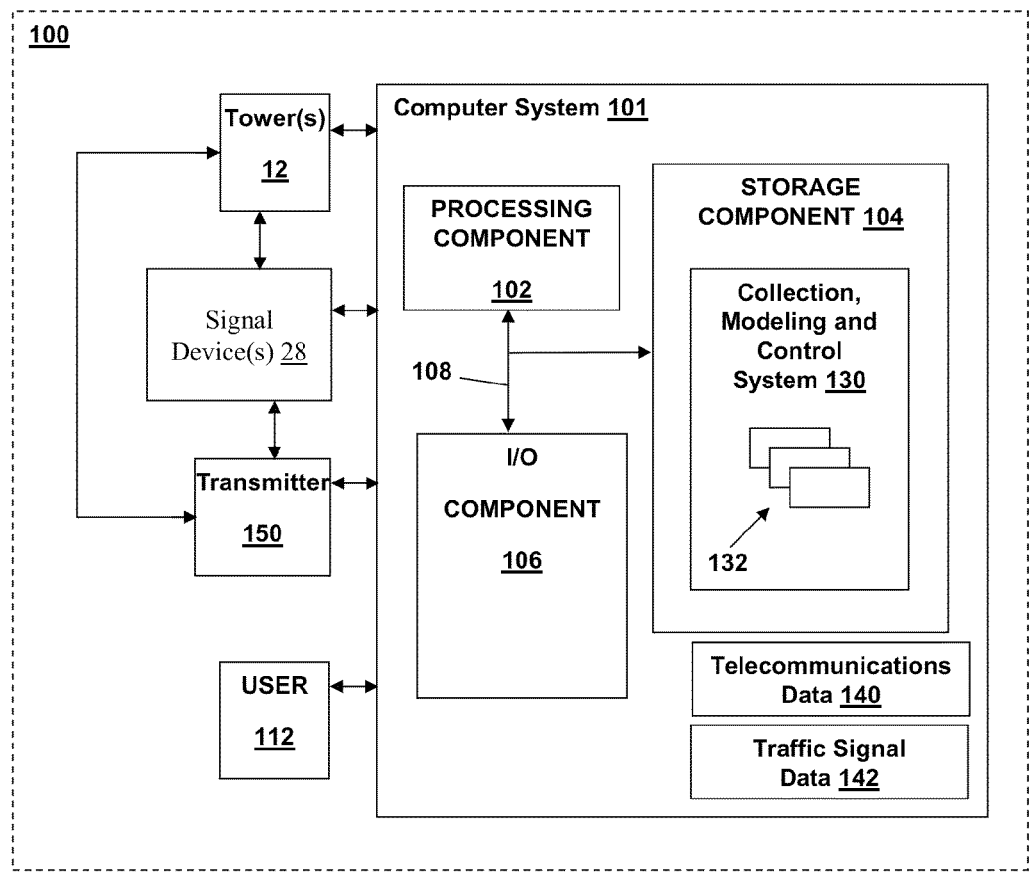
FIG. 3 shows an illustrative environment for monitoring traffic via telecommunications data according to various embodiments.

Referring to FIG. 3, an illustrative environment 100 for monitoring traffic via telecommunications data is shown. The environment 100 includes at least one computer system 101 and a collection, modeling and control system (e.g., program and/or hardware) 130 that can perform processes described herein in order to monitor traffic via telecommunications data.

The computer system 101 is shown including a processing component 102 (e.g., one or more processors), a storage component 104 (e.g., a storage hierarchy), an input/output (I/O) component 106 (e.g., one or more I/O interfaces and/or devices), and a communications pathway 108. In general, the processing component 102 executes program code, such as the collection, modeling and control system 130, which is at least partially fixed in the storage component 104. While executing program code, the processing component 102 can process data, such as telecommunication data 140, traffic signal data 142, and/or the like, which can result in reading and/or writing transformed data from/to the storage component 104 and/or the I/O component 106 for further processing. The pathway 108 provides a communications link between each of the components in the computer system 101. The I/O component 106 can include one or more human I/O devices, which enable a human user 112 to interact with the computer system 101 and/or one or more communications devices to enable a system user 112 to communicate with the computer system 101 using any type of communications link. To this extent, the collection, modeling and control system 130 can manage a set of interfaces (e.g., graphical user interface(s), application program interfaces, and/or the like) that enable human and/or system users 112 to interact with the collection, modeling and control system 130. Furthermore, the collection, modeling and control system 130 can manage (e.g., store, retrieve, create, manipulate, organize, present, etc.) the data, such as the telecommunications data 140, traffic signal data 142 and/or the like, using any solution. As described herein, the telecommunications data 140 can include data about the location, movement, etc. of a plurality of mobile devices, as received by one or more towers 12. The traffic signal data 142 can include data about current, past and/or future (planned) traffic signals displayed at the traffic signal devices 28, and may be obtained from a data log, traffic signal model, and/or from real-time communication with traffic signal devices 28 (via wireless and/or hard-wired means). Traffic signal data 142 can also include data transmitted by the collection, modeling and control system 130 instructing one or more towers 12 and/or one or more signal devices 28 to modify a traffic signal displayed at one or more of the signal devices 28.

The computer system 101 can include one or more general purpose computing articles of manufacture (e.g., computing devices) capable of executing program code, such as the collection, modeling and control system 130, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the collection, modeling and control system 130 can be embodied as any combination of system software and/or application software.

Furthermore, the collection, modeling and control system 130 can be implemented using a set of modules 132. In this case, a module 132 can enable the computer system 101 to perform a set of tasks used by the collection, modeling and control system 130, and can be separately developed and/or implemented apart from other portions of the collection, modeling and control system 130. As used herein, the term "component" means any configuration of hardware, with or without software, which implements the functionality described in conjunction therewith using any solution, while the term "module" means program code that enables a computer system 101 to implement the actions described in conjunction therewith using any solution. When fixed in a storage component 104 of a computer system 101 that includes a processing component 102, a module is a portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 101.

When the computer system 101 includes multiple computing devices, each computing device can have only a portion of the collection, modeling and control system 130 fixed thereon (e.g., one or more modules 132). However, it is understood that the computer system 101 and the collection, modeling and control system 130 are only representative of various possible equivalent computer systems that may perform a process described herein. To this extent, in other embodiments, the functionality provided by the computer system 101 and the collection, modeling and control system 130 can be at least partially implemented by one or more computing devices that include any combination of general and/or specific purpose hardware with or without program code. In each embodiment, the hardware and program code, if included, can be created using standard engineering and programming techniques, respectively.

When the computer system 101 includes multiple computing devices, the computing devices can communicate over any type of communications link. Furthermore, while performing a process described herein, the computer system 101 can communicate with one or more other computer systems using any type of communications link. In either case, the communications link can include any combination of various types of optical fiber, wired, and/or wireless links; include any combination of one or more types of networks; and/or utilize any combination of various types of transmission techniques and protocols.

While shown and described herein as a method and system for monitoring traffic via telecommunications data, it is understood that aspects of the invention further provide various alternative embodiments. For example, in one embodiment, the invention provides a computer program fixed in at least one computer-readable storage medium, which when executed, enables a computer system to monitor traffic via telecommunications data. To this extent, the computer-readable storage medium includes program code, such as the collection, modeling and control system 130, which enables a computer system to implement some or all of a process described herein. It is understood that the term "computer-readable storage medium" includes one or more of any type of tangible medium of expression, now known or later developed, from which a copy of the program code can be perceived, reproduced, or otherwise communicated by a computing device. For example, the computer-readable medium can include: one or more portable storage articles of manufacture; one or more memory/storage components of a computing device; paper; and/or the like.

Another embodiment of the invention provides a method of providing a copy of program code, such as the collection, modeling and control system 130, which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

Still another embodiment of the invention provides a method for monitoring traffic via a telecommunications data. In this case, a computer system, such as the computer system 101, can be obtained (e.g., created, maintained, made available, etc.) and one or more components for performing process(es) described herein can be obtained (e.g., created, purchased, used, modified, etc.) and deployed to the computer system. To this extent, the deployment can include one or more of: (1) installing program code on a computing device; (2) adding one or more computing and/or I/O devices to the computer system; (3) incorporating and/or modifying the computer system to enable it to perform a process described herein; and/or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
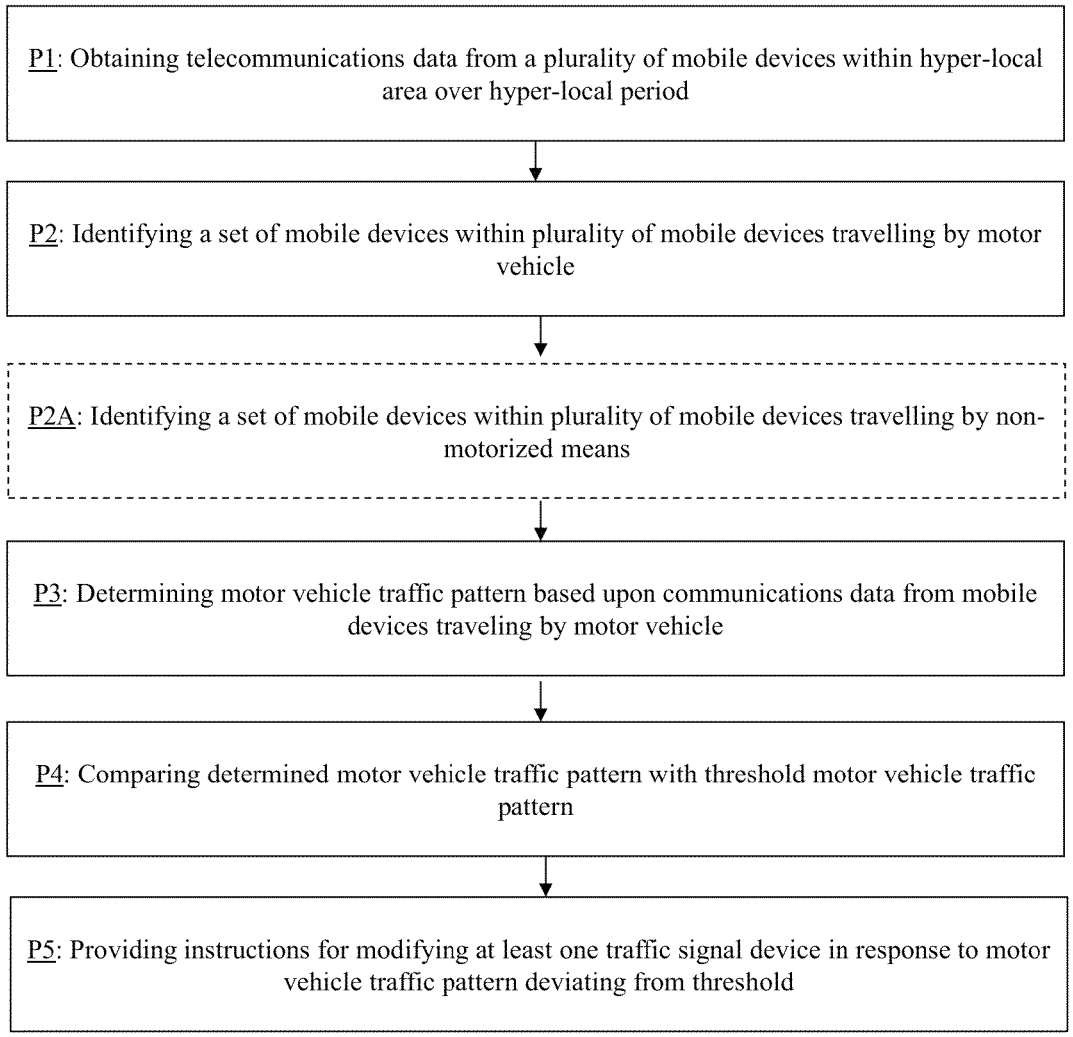
FIG. 4 shows a flow diagram illustrating processes according to various embodiments.

FIG. 4 shows a flow diagram illustrating a method according to various embodiments described herein. The processes shown and described with reference to FIG. 4 can be performed by the collection, modeling and control system 26 (and associated computing device(s)) shown and described with respect to FIG. 1 and FIG. 3. As shown, a method can include the following processes (not necessarily in this order):

Process P1: obtaining telecommunications data 140 from a plurality of mobile devices within a hyper-local area over a hyper-local period. According to various embodiments, the hyper-local area includes a geographic area intersecting five or fewer telecommunications towers. Further, according to various embodiments, the hyper-local period is equal to or less than approximately one minute. That is, the hyper-local area is geographically limited to a region in which a relatively small set of data is gathered, and the hyper-local period is limited to a time in which a relatively small set of data is gathered, when compared with various conventional approaches. This limited data set allows for efficient analysis of the pertinent telecommunications data 140 in order to perform the various processes described herein in a timely manner. The collection, modeling and control system 130 can obtain the telecommunications data 140 from one or more towers 12, e.g., via wireless and/or hard-wired communication with the tower(s) 12. The collection, modeling and control system 130 can communicate with one or more communications protocol(s) including broadly used standards so as to accommodate for enhanced (e.g., maximum) data capture capabilities. In some cases, these communications standards include protocols such as GSM, CDMA and/or GPRS, 3G standards such as W-CDMA, EDGE and/or CDMA2000, and/or 4G LTE;

Process P2: identifying a set of mobile devices within the plurality of mobile devices travelling by motor vehicle from the telecommunications data. In some embodiments, the identifying of the set of mobile devices within the plurality of mobile devices travelling by motor vehicle from the telecommunications data includes identifying approximately coordinated intermittent movement of the set of mobile devices. As described with respect to table 30, log data such as the telecommunications data 140 indicating time-stamps within sectors (e.g., Sector 1, Sector 2, . . . Sector 9) can indicate the movement of a mobile device within the hyper-local area. Those time-stamps can indicate an approximate speed of travel, acceleration, deceleration, stop/start, etc. Further, a grouping of the time-stamps from the telecommunications data 140 can indicate which mobile devices within the plurality of mobile devices within the hyper-local area are moving approximately in an approximately coordinated manner. That is, the telecommunications data 140 including sector time-stamps can indicate that a group of mobile devices are moving in a similar pattern of stop, go, stop, go; which may indicate that these mobile devices are moving approximately together in automobile traffic. Additionally, the collection, modeling and control system 130 can determine movement (e.g., between sectors) of one or more mobile devices within the hyper-local area based upon the strength of signals received from mobile device(s) at different towers 12 within the hyper-local area;

Process P2A (optional in some embodiments, as illustrated in phantom): prior to, after, and/or concurrently with Process P2, Process P2A can include identifying a set of mobile devices within the plurality of mobile devices traveling by non-motorized means from the telecommunications data. As described with reference to process P2, the collection, modeling and control system 130 can determine whether a set of mobile devices is traveling by motorized means or non-motorized means. For example, in recognizing the difference between foot traffic and automobile traffic, the collection, modeling and control system 130 can use a threshold signal density measurement to indicate whether a group of mobile devices are traveling by motorized or non-motorized means. In some cases, this threshold signal density measurement can be based upon a number of stationary signals detected within a sector or particular sub-region in a sector. For example, using a threshold signal density measurement of approximately 12 stationary mobile device signals (urban) or approximately 6 stationary mobile device signals (suburban) within a given sector or sub-region in a sector, the collection, modeling and control system can determine whether a plurality of mobile devices belong to pedestrians (e.g., at or exceeding 12 signals within the defined urban area, or at or exceeding 6 signals within the defined suburban area), or motor-vehicle drivers/passengers and/or cyclists (below 12 signals, urban; below 6 signals suburban). According to various embodiments, the collection, modeling and control system 130 can also use a subtraction calculation (e.g., in urban and/or suburban areas) to remove data attributed with pedestrian mobile device carriers not relevant to a particular traffic pattern, e.g., mobile phones belonging to people while in apartments, shops, parks, municipal or other buildings, etc.

The collection, modeling and control system 130 can store and/or obtain population density data for the hyper-local area (e.g., extrapolating or otherwise modifying from larger or smaller population density data), determine or obtain an average population density for the hyper-local area and subtract data attributed with the average number of people carrying a mobile device within that hyper-local area so as to more closely tailor the analysis to data pertaining to mobile devices moving in traffic (e.g., vehicle and/or pedestrian traffic);

Process P3: determining the motor vehicle traffic pattern based upon the telecommunications data from the set of mobile devices traveling by motor vehicle. This process can include modeling and/or filtering data pertaining to those mobile devices traveling by motor vehicle (from the larger set of telecommunications data 140), using various methods described with reference to Process P2 and P2A;

Process P4: comparing the determined motor vehicle traffic pattern with a threshold motor vehicle traffic pattern. This process can include comparing the movement of set of mobile devices traveling by motor vehicle with one or more threshold(s) that include desired speed, acceleration, congestion level, etc. These threshold(s) can be based upon desired traffic patters at particular times of day, under particular weather conditions, under certain traffic loads (e.g., a number of motor vehicles in a surrounding area at a given time), etc. In some cases, these threshold(s) can be configured based upon local traffic laws; and Process P5: providing instructions for modifying at least one traffic signal device (e.g., via traffic signal data 142, FIG. 3) in response to the determined motor vehicle traffic pattern deviating from the threshold motor vehicle traffic pattern. According to various embodiments, the process of providing instructions for modifying the at least one traffic signal device includes initiating a local pre-emptive signal tuned for the traffic signal device. In some cases, the local pre-emptive signal includes at least one of an acoustic pattern, a radio signal or a global positioning system (GPS) signal. According to various embodiments, the at least one traffic signal (device) includes a motor vehicle traffic signal, e.g., a motor vehicle traffic signal device. In some cases, where the process includes process P2A (identifying a set of mobile devices traveling by non-motorized means, e.g., bicycle, walking, jogging, etc.), the process of providing instructions for modifying the at least one traffic signal device can include a non-motorized vehicle traffic signal (e.g., a walk/don't walk sign, a bicycle lane signal, etc.). According to various embodiments, the collection, modeling and control system 130 can send a signal (pre-emptive signal) to one or more traffic signal device(s) 28 in order to modify the traffic signal at that device 28 and initiate a change in the determined traffic pattern. In some cases, the signal (pre-emptive signal) is a short-range transmission that can take the form of an acoustic pattern, radio signal and/or GPS signal. In various embodiments, the collection, modeling and control system 130 initiates an HTTP or API request, which initiates an MQTT message that is sent to a radio signal transmitter near the cellular tower 12. The MQTT request triggers a local device, (e.g., a telematics device including navigation, vehicle management, media etc. systems conventionally preconfigured with the vehicle) to send a predetermined signal (e.g., a 900 MHz signal) to the surrounding pre-emptive signal receivers (e.g., traffic signal devices 28). These signals initiate a change in the traffic signal at the one or more traffic signal devices 28 to cause a change in the traffic pattern as desired.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

It is understood that in the flow diagrams shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one computing device configured to monitor a motor vehicle traffic pattern by performing actions including:
   obtaining telecommunications data from a plurality of mobile devices within a hyper-local area over a hyper-local period,
   wherein the hyper-local area includes a geographic area intersecting five or fewer telecommunications towers;
   identifying a set of mobile devices within the plurality of mobile devices travelling by motor vehicle from the telecommunications data;
   determining the motor vehicle traffic pattern based upon the telecommunications data from the set of mobile devices traveling by motor vehicle;
   comparing the determined motor vehicle traffic pattern with a threshold motor vehicle traffic pattern; and
   providing instructions for modifying at least one traffic signal device in response to the determined motor vehicle traffic pattern deviating from the threshold motor vehicle traffic pattern.

2. The system of claim 1, wherein the providing of the instructions for modifying the at least one traffic signal device includes initiating a local pre-emptive signal tuned for the traffic signal device.

3. The system of claim 2, wherein the local pre-emptive signal includes at least one of an acoustic pattern, a radio signal or a global positioning system (GPS) signal.

4. The system of claim 1, wherein the at least one traffic signal includes a motor vehicle traffic signal.

5. The system of claim 1, further comprising identifying a set of mobile devices within the plurality of mobile devices traveling by non-motorized means.

6. The system of claim 5, wherein the at least one traffic signal includes a non-motorized vehicle traffic signal.

7. The system of claim 1, wherein the hyper-local period is equal to or less than approximately one minute.

8. The system of claim 1, wherein the identifying of the set of mobile devices within the plurality of mobile devices travelling by motor vehicle from the telecommunications data includes identifying approximately coordinated intermittent movement of the set of mobile devices.

9. A computer-implemented method of monitoring a motor vehicle traffic pattern, the computer-implemented method comprising:
- obtaining telecommunications data from a plurality of mobile devices within a hyper-local area over a hyper-local period,
- wherein the hyper-local area includes a geographic area intersecting five or fewer telecommunications towers;
- identifying a set of mobile devices within the plurality of mobile devices travelling by motor vehicle from the telecommunications data;
- determining the motor vehicle traffic pattern based upon the telecommunications data from the set of mobile devices traveling by motor vehicle;
- comparing the determined motor vehicle traffic pattern with a threshold motor vehicle traffic pattern; and
- providing instructions for modifying at least one traffic signal device in response to the determined motor vehicle traffic pattern deviating from the threshold motor vehicle traffic pattern.

10. The computer-implemented of claim 9, wherein the providing of the instructions for modifying the at least one traffic signal device includes initiating a local pre-emptive signal tuned for the traffic signal device.

11. The computer-implemented of claim 10, wherein the local pre-emptive signal includes at least one of an acoustic pattern, a radio signal or a global positioning system (GPS) signal.

12. The computer-implemented of claim 9, wherein the at least one traffic signal includes a motor vehicle traffic signal or a non-motorized vehicle traffic signal.

13. The computer-implemented of claim 9, further comprising identifying a set of mobile devices within the plurality of mobile devices traveling by non-motorized means.

14. The computer-implemented of claim 9, wherein the hyper-local period is equal to or less than approximately one minute.

15. The computer-implemented of claim 9, wherein the identifying of the set of mobile devices within the plurality of mobile devices travelling by motor vehicle from the telecommunications data includes identifying approximately coordinated intermittent movement of the set of mobile devices.

16. A computer program product comprising program code embodied in at least one non-transitory computer-readable storage medium, which when executed by at least one computing device, enables the at least one computing device to monitor a motor vehicle traffic pattern by performing actions including:
- obtaining telecommunications data from a plurality of mobile devices within a hyper-local area over a hyper-local period,
- wherein the hyper-local area includes a geographic area intersecting five or fewer telecommunications towers;
- identifying a set of mobile devices within the plurality of mobile devices travelling by motor vehicle from the telecommunications data;
- determining the motor vehicle traffic pattern based upon the telecommunications data from the set of mobile devices traveling by motor vehicle;
- comparing the determined motor vehicle traffic pattern with a threshold motor vehicle traffic pattern; and
- providing instructions for modifying at least one traffic signal device in response to the determined motor vehicle traffic pattern deviating from the threshold motor vehicle traffic pattern.

17. The computer program product of claim 16, wherein the providing of the instructions for modifying the at least one traffic signal device includes initiating a local pre-emptive signal tuned for the traffic signal device, wherein the local pre-emptive signal includes at least one of an acoustic pattern, a radio signal or a global positioning system (GPS) signal.

18. The computer program product of claim 16, wherein the hyper-local period is equal to or less than approximately one minute.

19. The computer program product of claim 16, wherein the identifying of the set of mobile devices within the plurality of mobile devices travelling by motor vehicle from the telecommunications data includes identifying approximately coordinated intermittent movement of the set of mobile devices.

20. The system of claim 1, wherein the at least one computing device is further configured to monitor a non-motorized traffic pattern by performing further actions including:
- identifying a set of mobile devices within the plurality of mobile devices travelling by non-motorized means from the telecommunications data;
- determining the non-motorized traffic pattern based upon the telecommunications data from the set of mobile devices traveling by non-motorized means;
- comparing the determined non-motorized traffic pattern with a threshold non-motorized traffic pattern; and
- providing instructions for modifying at least one non-motorized vehicle traffic signal device in response to the determined non-motorized traffic pattern deviating from the threshold non-motorized traffic pattern.

* * * * *